(12) United States Patent
Alloin

(10) Patent No.: US 7,289,554 B2
(45) Date of Patent: Oct. 30, 2007

(54) METHOD AND APPARATUS FOR CHANNEL EQUALIZATION AND CYCLOSTATIONARY INTERFERENCE REJECTION FOR ADSL-DMT MODEMS

(75) Inventor: Laurent Francis Alloin, Monmouth Beach, NJ (US)

(73) Assignee: Brooktree Broadband Holding, Inc., Newport Beach, CA (US)

( * ) Notice: Subject to any disclaimer, the term of this patent is extended or adjusted under 35 U.S.C. 154(b) by 738 days.

(21) Appl. No.: 10/618,678

(22) Filed: Jul. 15, 2003

(65) Prior Publication Data

US 2005/0013353 A1  Jan. 20, 2005

(51) Int. Cl.
*H04B 1/38* (2006.01)
(52) U.S. Cl. .................. 375/222; 370/201; 370/484
(58) Field of Classification Search ............. 375/222, 375/232, 350, 285; 370/201, 286, 290–291, 370/484–485; 379/22.02, 32.01
See application file for complete search history.

(56) References Cited

U.S. PATENT DOCUMENTS

| | | | |
|---|---|---|---|
| 5,566,167 A * | 10/1996 | Duttweiler | 370/290 |
| 5,859,914 A * | 1/1999 | Ono et al. | 381/66 |
| 5,991,311 A | 11/1999 | Long et al. | |
| 6,266,347 B1 | 7/2001 | Amrany et al. | |
| 6,393,051 B1 | 5/2002 | Koizumi et al. | |
| 6,944,289 B2 * | 9/2005 | Tahernezhaadi et al. | 379/406.01 |
| 6,999,504 B1 * | 2/2006 | Amrany et al. | 375/222 |
| 6,999,517 B1 * | 2/2006 | Bombay et al. | 375/257 |

OTHER PUBLICATIONS

Koen Vanbleu, Geert Ysebaert, Marc Moonen, Piet Vandaele; "Combined Equalization and Alien Crosstalk Cancellation in ADSL Receivers"; Proc. 3rd IEEE Benelux Signal Processing Symposium (SPS-2002), Belgium, Mar. 21-22, 2002; vanbleu,ysebaert,moonen@esat.kuleuven.ac.be; piet.vandaele@alcatel.be.

* cited by examiner

*Primary Examiner*—Khanh Tran
(74) *Attorney, Agent, or Firm*—Thomas, Kayden Horstemeyer & Risley, LLP

(57) ABSTRACT

A method and apparatus for efficient filter structure for an enhanced operation of an ADSL-DMT modem on a subscriber loop with an environment consisting of ISDN interference. The method performs equalization of the channel by impulse response shortening and at the same time rejecting interference signals exhibiting cyclostationary properties. The method and apparatus for reducing the crosstalk involves a frequency-shifted versions of the received signal being filtered through frequency-shifted adaptive filters in the appropriate branches, and providing a joint time domain equalizer/crosstalk canceller to perform equalization of the channel and crosstalk cancellation in one instance and a separate crosstalk canceller to cancel crosstalk plus a time domain equalizer to equalize the channel. Downsampling the signal outputs of both the combined crosstalk equalizer and the frequency-shifted adaptive filters to reduce sampling rate; and subtracting the outputs of the combined crosstalk equalizer and the frequency-shifted adaptive filters to remove the cyclostationary interferer.

28 Claims, 30 Drawing Sheets

METHOD AND APPARATUS FOR CHANNEL EQUALIZATION AND CYCLOSTATIONARY INTERFERENCE REJECTION FOR ADSL-DMT MODEMS

FIELD OF THE INVENTION

The present invention relates generally to ADSL-DMT modulation and in particular a method and apparatus for reducing or canceling crosstalk disturbances to ADSL-DMT modems within environments exhibiting ISDN interference.

BACKGROUND OF THE INVENTION

With the advent of the Internet and other high-bandwidth electronic communication systems and the consumer demand for information, interactive gaming and electronic entertainment such as video on-demand, there has been a substantial need for reliable and affordable high bandwidth mediums for facilitating data transmissions between service providers and their customers. In relation to the requirement that such mediums be affordable to consumers and structurally attainable in a cost-effective manner for providing service to customers involves using already existing copper wire telephone systems (plain old telephone system or POTS) infrastructure.

Relating specifically to the adaptation of POTS telephone lines to carry data at a higher bandwidth is the adaptation of a digital connection known as ISDN (Integrated Services digital Network) in which a date rate of 64 Kilobits per second is supported. Most recently, ISDN services has largely been replaced in certain parts of the world by broadband internet services, such as Digital Subscriber Line (xDSL). Standards and protocols for many flavors of DSL have been proposed such as VDSL (for high speed digital transmission over short distances), HDSL, SDSL (with symmetric transmission speeds) and ADSL (with asymmetric uplink and downlink transmission speeds). Relating specifically to ADSL, ADSL essentially operates by formatting signals using various Time Domain Equalization techniques to send packets over copper wire at high data rates. ADSL is considered advantageous for its ability to provide very high data rates in the downstream (i.e., from service provider to the user) direction by sacrificing speed in the upstream direction. Consequently, end user costs are minimized by providing higher speeds in the most commonly used direction.

Two of the proposed standards for the specific requirements for an ADSL system operation are set forth by the International Telecommunications Union, Telecommunications Standardization Section (ITU-T). A first, conventional, ADSL standard is described in ITU-T Recommendation G.992.1—"Asymmetric Digital Subscriber Line (ADSL) Transceivers", also known as full rate ADSL (G.dmt) which describes three types of system operation modes, Annex A, Annex B and Annex C. Annex A describes the specific requirements for an ADSL system operating in the frequency band above the conventional frequency band employed in the POTS system. Annex B describes the specific requirements for an ADSL system operating in the frequency band above the conventional frequency band employed by ISDN lines as defined in ITU-T recommendation G.961 appendices I and II. Lastly, Annex C describes the specific requirements for an ADSL system operating in the same cable as ISDN as defined in ITU-T recommendation G.961 appendix III. Annex A and B are primarily used in North America and Europe, whereas Annex C (ADSL above POTS) co-existing with TCM-ISDN (Time Compression Multiplexed (TCM) ISDN—a type of "ping-pong" time division transmission) is implemented primarily in Japan. For purposes of clarity, the body of G.992.1 is fully incorporated herein by reference.

A second, more recently proposed ADSL standard is the G.992.2 or 'G.lite' standard, further described in ITU-T Recommendation G.992.2—"Splitterless Asymmetric Digital Subscriber Line (ADSL) Transceivers", which comprise Annex A (FDM ADSL above POTS) mostly implemented in North America, Annex B (ADSL above ISDN) mostly implemented in Europe and Annex C (ADSL above POTS, co-existing with TCM-ISDN) implemented mostly in Japan which is also bodily incorporated by reference herein. The G.lite standard is a variant of the G.992.1 standard, with modifications directed primarily to work in a splitterless environment (i.e., without a splitter at the remote user end to separate the voice traffic from the digital data traffic). ADSL is made available in two modulation schemes known as Discrete Multitone (DMT) and Carrierless Amplitude and Phase (CAP). An asymmetric model such as ADSL complements the residential profile of Internet use: Masses of multi-media and text is transferred downstream, and undemanding levels of traffic make their way upstream.

The present application is directed primarily to the DMT mode of modulation, wherein DMT slices available frequencies into 256 channels of 4.3125 KHz each, within a bandwidth range of 30 KHz to 1104 KHz. Unfortunately, with such a system ISDN signals either co-transmitted in the same wire or provided in close proximity to the ADSL DMT signals can create a significant source of interference. ISDN uses a baseband modulation of different baud rates, such as, for example, 80 KHz for Annex B and 320 KHz for Annex C. However, from the bandwidth allocated for ISDN and ADSL, there is an overlap of bandwidth between the two, and that results in a strong crosstalk from having ADSL and ISDN signal transmission on the same cable bundle as it is found in Japan where Annex C and lesser degree of crosstalk in Europe where Annex B is implemented.

As defined in Annex B of the G.dmt ITU-T recommendation, a new ADSL service might be required to operate over ISDN on the same twisted pair. The partial spectrum overlapping of ISDN into the ADSL bandwidth limits the operation of the ADSL system, as the useful ISDN signal clearly supersedes in this configuration any other noise source. However, in both situations described above, the interference signal presents some statistical properties that can be used to successfully mitigate or eliminate completely the effects of the interference onto the ADSL transmission. These properties originate from the cyclostationary nature of the interference: i.e. interferers and cross-talk statistics are periodic with period equal to some time interval related to the baud rate of the modulated interference signal. A dual definition of cyclostationarity is that frequency-shifted versions of the baud modulated interferer can be highly correlated with the original signal. More formally, a cyclostationary signal is defined as a signal having periodically time-varying second order statistics (i.e. periodic autocorrelation), for example, if a signal x is cyclostationary with a cyclic frequency $\alpha$, then there is non-zero correlation between the signal x and the same signal x, shifted in frequency by $\alpha$.

Referring now to FIG. 1, there is shown a graphical representation of a spectrum of a typical ISDN interferer as depicted in ADSL, Annex B. The property of cyclostationarity of the signal can be interpreted from FIG. 1, where each side-lobe of the modulated signal is a filtered replica of the main (base-band) lobe i.e., a strong correlation exists between each side-lobe of the transmitted spectrum. A shaping filter at the transmitter preserves significant energy in the secondary lobes, making it possible to detect strong correlation between adjacent frequency bands in the signal received on the line. Baud-modulated signals such as ISDN, HDSL, SDSL (to name a few) which are used in data communication exhibits cyclostationary property by design, but unlike ISDN, the others do not exhibit a property of a strong correlation of each side lobes of the transmitted spectrum. This property is inherent to the transmission of a flow of statistically independent data symbols, chosen among a given symbol set, each symbol is characterized by a given phase and amplitude and is stationary over a well-specified baud period, determined by the transmitter's modulation rate. The spectrum of such a statistically independent modulated data symbol flow can be seen as repetitive with a frequency identical to the baud rate used for the modulation.

The periodicity of the spectrum is evidenced by the intrinsic cyclostationary property of such baud-modulated signals. The repetition of the spectrum at multiple of the baud rate means that adjacent frequency bands will be correlated even after filtering is used at the transmitter. In some cases, filtering may preserve the energy of the secondary frequency bands, leaving a strong correlation. In other cases, filtering will only leave a small fraction of the energy from the secondary frequency bands in an effort to band-limit the transmitted signals, therefore leaving a small "excess bandwidth" from which correlation still can be seen but with a lesser amplitude.

In a system operating in an Annex C environment, NEXT cross-talk from existing TCM-ISDN is the major performance-limiting impairment for the ADSL DMT transmission. From the property of cyclostationarity of the TCM-ISDN interferer to the ADSL-DMT signal, it is a major factor contributing to crosstalk interference in Annex C environment. In an Annex B system, the ADSL DMT signal is transmitted on the same twisted pair as an already existing ISDN link. As a result, the two signals are partially overlapping channels.

In both cases mentioned above, the property of cyclostationarity is present in the ISDN interference. Exploitation of this signal property can be used to allow the separation of the two temporally and spectrally overlapping communications signals. This can result in an enhanced waveform extraction and digital data detection of the useful ADSL DMT signal.

Crosstalk, is an electrical energy radiating from bundles of wire converging at a service provider's CO that produce an inconvenient disturbance known as Near-End Crosstalk (NEXT) or Far-End Crosstalk (FEXT). Referring to the prior art of FIGS. 2a and 2b, When TCM-ISDN downstream signals wander between channels of different cables, line capacity takes a dive. "Near end" specifies that the interference derives from an adjacent pair of cables at the same location. Usually, the twisted pairs are in the same cable or bundle. Crosstalk is generally characterized as NEXT or FEXT. FEXT is characterized by the disturbing pair's (in this case, the TCM-ISDN signal) source being distant from the disturbed pair's (in this case the ADSL signal) receiver. In this case, the disturbing signal propagates down the disturbing pair, crosstalk into the disturbed pair and propagates the rest of the distance along the disturbed pair into the disturbed pair's receiver.

Therefore, there is a need in the art of ADSL systems for a more efficient method and system for reducing crosstalk, and to overcome the aforementioned interference problems.

SUMMARY OF THE INVENTION

An object of the present invention is to provide a method and apparatus for reducing or eliminating near-end crosstalk (NEXT) and far-end crosstalk (FEXT) interference on digital subscriber line (DSL) systems from integrated services digital network (ISDN) systems that co-exist within the same binder or in adjacent binders, or operate on the same twisted pair.

One embodiment of the present invention is directed to a method and apparatus for a combined equalizer/cyclostationary crosstalk canceller that achieves equalization and cyclostationary crosstalk removal; the combined equalizer/cyclostationary crosstalk canceller and method consists of frequency shifters represented by modulators at multiple of the interferer baud rates, followed by adaptive filters, followed by decimators in some situations, before a summation or recombination of the signals is performed The number of shifters, length of the respective adaptive filters, the rate at which these filters operate (which may differ from one filter to another) can vary, rendering the use of the decimators optional.

Another embodiment of the present invention provides a first alternative structure for conserving the higher sampling rates up until the recombination, followed by a possible down-sampling. Keeping a high sampling rate may avoid aliasing effects, that may have occurred if downsampling were performed before the recombination of the signals.

Another embodiment of the invention is a method and apparatus operating with or without decimators, but which incorporate filters in some of the respective frequency shifted paths, such filters may be fixed in that their implementation is to isolate the desired signal components of the interferer only, and such filters may be selected from a group of filters consisting of low-pass, high-pass or band pass, and fixed one given that the interferer is known. Alternative structures arises from multiple embodiments that may result from having the fixed filters placed upstream of the adaptive filters in the frequency-shifted paths, one or more fixed filters placed upstream of the demodulators, all paths including the main path having fixed filters placed upstream of the adaptive filters. Yet another embodiment of the present invention is a method and apparatus of having the fixed filters placed downstream from the adaptive filters.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention can be understood more completely by reading the following Detailed Description of the Preferred Embodiments, in conjunction with the accompanying drawings, in which.

DETAILED DESCRIPTION OF THE PREFERRED EMBODIMENTS

The following description is intended to convey a thorough understanding of the invention by providing a number of specific embodiments and details involving the reduction or cancellation of crosstalk in ADSL systems co-located with ISDN. It should be understood, however, that the invention is not limited to these specific embodiments and details, which are provided for exemplary purposes only. It should be further understood that one possessing ordinary skill in the art, in light of known systems and methods, would appreciate the use of the invention for its intended purposes and benefits in any number of alternative embodiments, depending upon specific design and other needs. For example, the system and method described below may also have application in reducing or canceling crosstalk in ADSL systems co-located with other types of cyclostationary disturbers.

Figure 3:
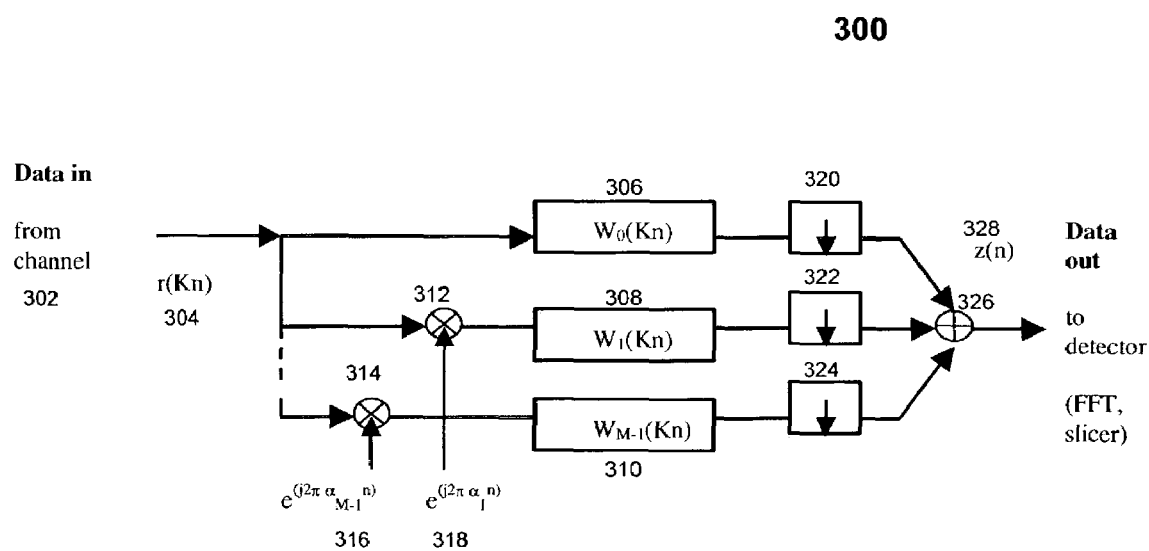
FIG. 3 is a simplified block diagram illustrating one embodiment of a cyclostationary equalizer structure and noise canceller for a Multicarrier system such as DMT.

One embodiment of the present invention is directed to a method and apparatus that significantly reduces the NEXT and FEXT interferences due to the presence of ISDN signals in the same bundle of twisted pair wires as an ADSL-DMT signal as recommended ITU-T G.992.1 Annex B and Annex C. In reference to FIG. 3, there is shown a simplified block diagram 300 illustrating a method and apparatus comprising the steps of receiving a signal 304, that consists of the desired ADSL-DMT signal as well as the interfering ISDN signal from a channel. Next, the received signal is demodulated with demodulators 312, 314 and frequency-shifted by the baud rate of the interfering ISDN signal by frequency shifters 316 and 318. The original signal is passed onto a time domain equalizer 306, and the replicas of the received signal are passed to parallel time-domain equalizers 308 and 310 to remove the interference and preserve the desired signal. Next, the output of the parallel time-domain equalizers are individually downsampled at downsamplers 320, 322 and 324 in order to reduce the sampling rate. The downsampled signals are then added together at combiner 326, where the frequency shifted side lobes of the ISDN interferer signal cancels each other in the parts of the spectrum shared with the ADSL DMT signal. The desired signal 328 is then passed onto other parts of the receiver, such as FFT and slicer for further processing.

Figure 4:
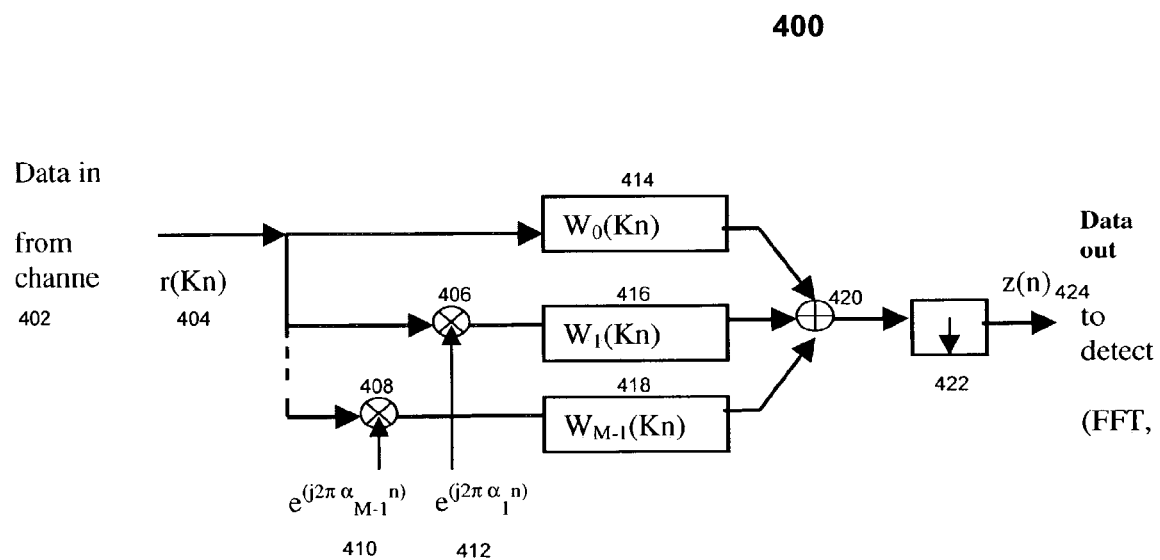
FIG. 4 is a simplified block diagram illustrating an alternative embodiment of a cyclostationary equalizer structure and noise canceller optimized to avoid aliasing.

Referring now to FIG. 4, there is shown a second embodiment of the present invention. In particular, the illustrated first alternative structure 300, conserves the higher sampling rates up until the recombination. Keeping a high sampling rate may avoid aliasing effects, that may have occurred if downsampling were performed before the recombination of the signals. In the present embodiment, a block diagram 400 is shown with one downsampler 422, used after the recombination at 420, in order to reduce the sampling rate before the signal is passed onto the detector for further processing.

Figure 5:
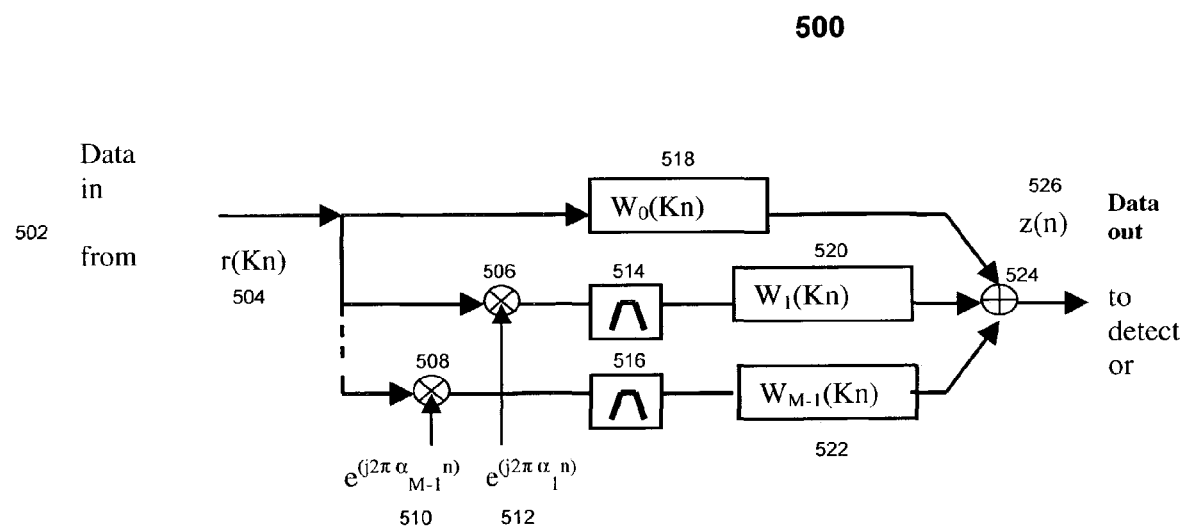
FIG. 5 is a simplified block diagram illustrating an alternative cyclostationary equalizer structure and noise canceller having fixed filters placed upstream from adaptive filters in accordance with an embodiment of the present invention.

Referring now to FIG. 5, there is shown a third embodiment of the present invention 500, wherein downsamplers are not incorporated in the receiver structure. However, a plurality of filters 514, 516 are incorporated in the respective frequency shifted paths. Such filters 514, 516 may be fixed in that their implementation is to isolate the desired signal components off from the interferer. In a preferred embodiment, the filters 514, 516 are selected from a group of filters consisting of low-pass, high-pass or band pass, and a fixed filter in the event that the interferer is known. The alternative embodiment disclosed teaches a method and apparatus of having the fixed filters 514, 516 placed upstream from the adaptive filters 520, 522, in order to isolate the desired signal components 526 from the interferer.

Figure 6:
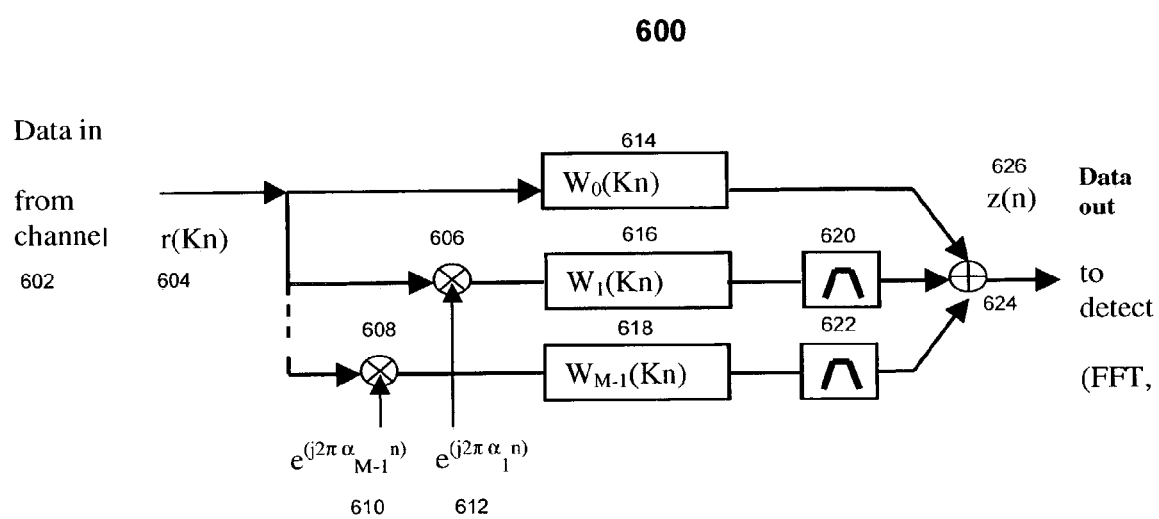
FIG. 6 is a simplified block diagram illustrating an alternative cyclostationary equalizer structure and noise canceller having fixed filters placed downstream from adaptive filters in accordance with an embodiment of the present invention.

Referring now to FIG. 6, there is shown a fourth embodiment 600 of the present invention. In particular, the embodiment of FIG. 6 is similar to that shown in FIG. 5 in that downsamplers are not provided, but which incorporate filters 620, 622 in some of the respective frequency shifted paths. In the present embodiment, the fixed filters 620, 622 are placed downstream from the adaptive filters 616, 618 as shown in FIG. 6.

Figure 7:
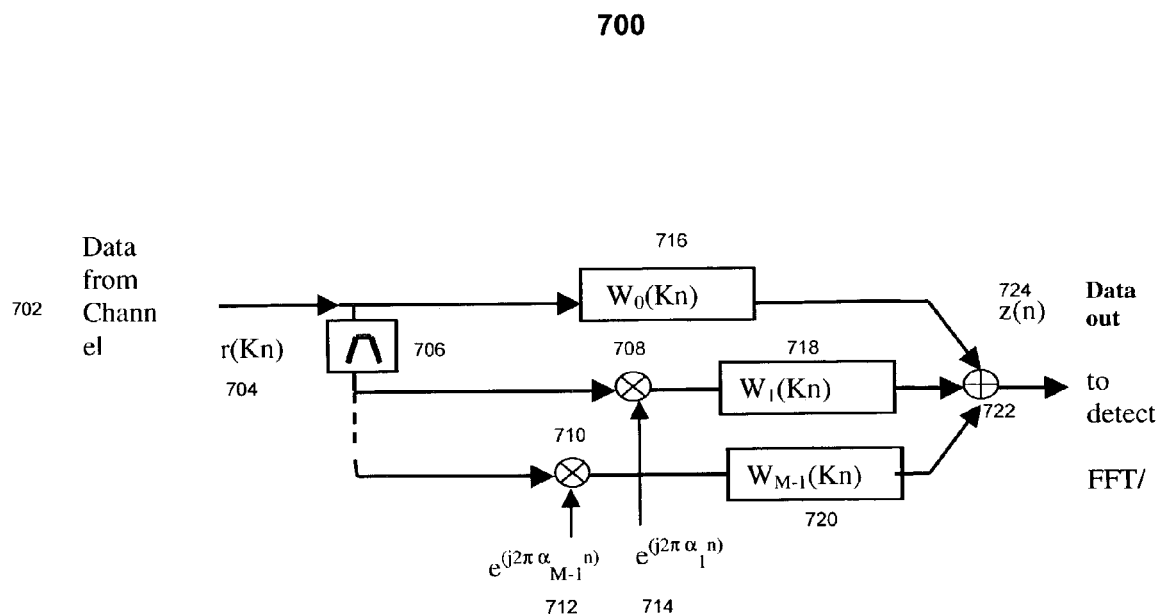
FIG. 7 is a simplified block diagram illustrating an alternative cyclostationary equalizer structure and noise canceller having one fixed filter placed upstream from demodulators in accordance with an embodiment of the present invention.

Another embodiment of the invention is a method and apparatus 700, operating without downsamplers, but which incorporate the use of filters in the respective frequency shifted paths, such filters may be fixed in that their implementation is to isolate the desired signal components of the interferer only, such filters are selected from a group of filters consisting of low-pass, high-pass or band pass, and fixed one (given that the interferer is known). The alternative embodiment disclosed teaches a method and apparatus of having one fixed filter 706, operating in one of the frequency-shifted paths and placed upstream from the demodulator 708, in order to isolate the desired signal components from the overall signal and reject the interferer and by using only one filter and not utilizing any downsamplers, the receiver components are minimized, thereby reducing the size of the receiver as shown in FIG. 7.

Figure 8:
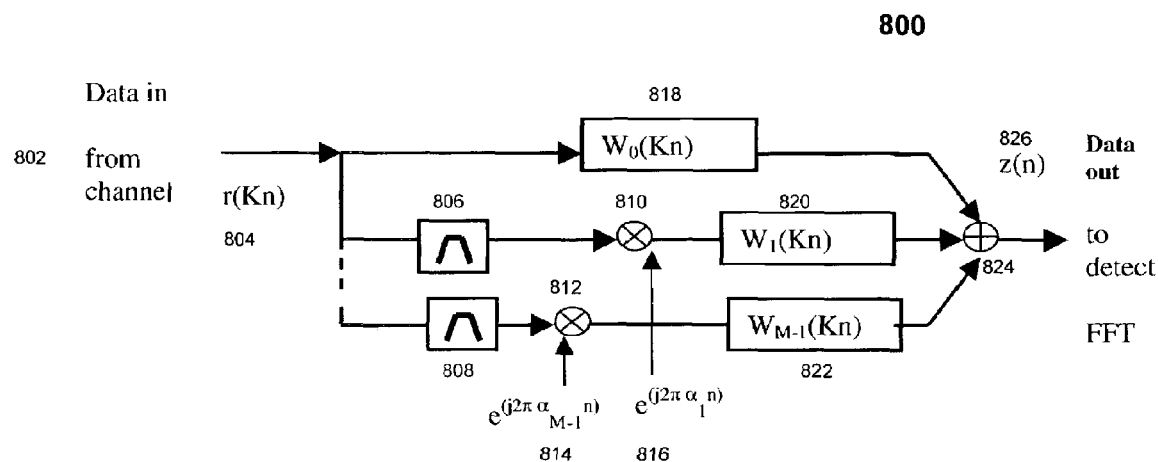
FIG. 8 is a simplified block diagram illustrating an alternative cyclostationary equalizer structure and noise canceller having multiple fixed filters placed upstream from demodulators in accordance with an embodiment of the present invention.

Another embodiment of the invention and in reference to FIG. 8, there is shown a method and apparatus 800, operating without downsamplers, but which incorporate filters in some of the respective frequency shifted paths, such filters may be fixed in that their implementation is to isolate the desired signal components of the interferer only, such filters are selected from a group of filters consisting of low-pass, high-pass or band pass, and fixed one (given that the interferer is known). The alternative embodiment is similar to the embodiment of FIG. 7, except disclosed method and apparatus teaches a method and apparatus of having more than one fixed filters 806, 808 operating in one of the frequency-shifted paths and placed upstream from respective demodulators 810, 812 in order to isolate the desired signal components from the overall signal and reject the interferer of having fixed filters placed upstream from the demodulators in the frequency-shifted path to isolate the desired signal components of the interferer, as shown in FIG. 8.

Figure 9:
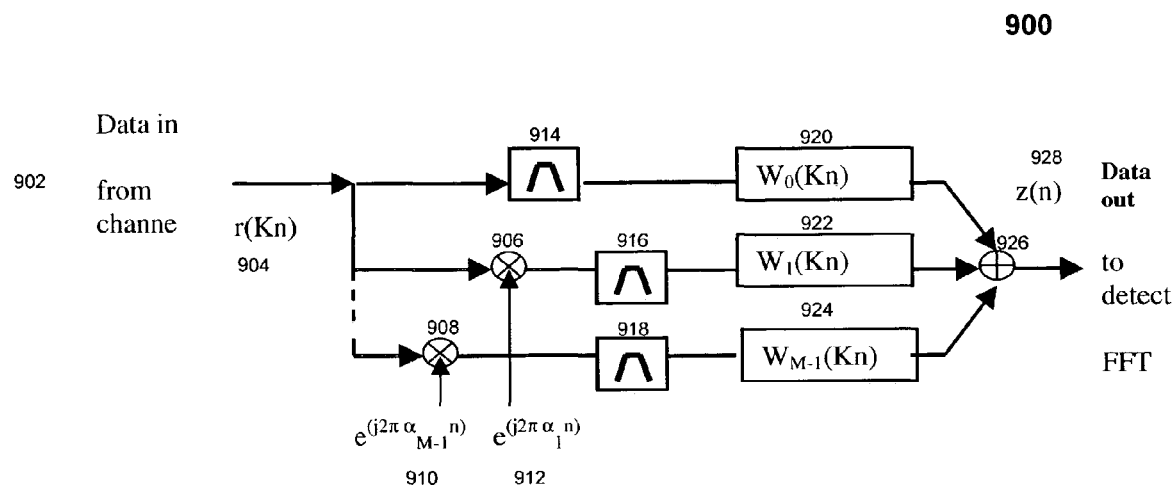
FIG. 9 is a simplified block diagram illustrating an alternative cyclostationary equalizer structure and noise canceller having fixed filters placed upstream from adaptive filters including a main path in accordance with an embodiment of the present invention.

Another embodiment of the invention and in reference to FIG. 9, filters 917, 916, and 918 are placed in the path of the main received signal as well as the respective frequency shifted paths, such filters may be fixed in that their implementation is to isolate the desired signal components of the interferer only, such filters are selected from a group of filters consisting of low-pass, high-pass or band pass, and fixed one when the interfering signal is known. The alternative embodiment, disclosed in FIG. 9, teaches a method and apparatus of implementing a fixed filter 914 placed in the main path of the received signal, in order to filter out any out-of-band interference to the ADSL-DMT signal, as well as placing filters 916 and 918 downstream from the demodulators in the frequency-shifted path to isolate the desired signal components of the interferer.

Figure 10:
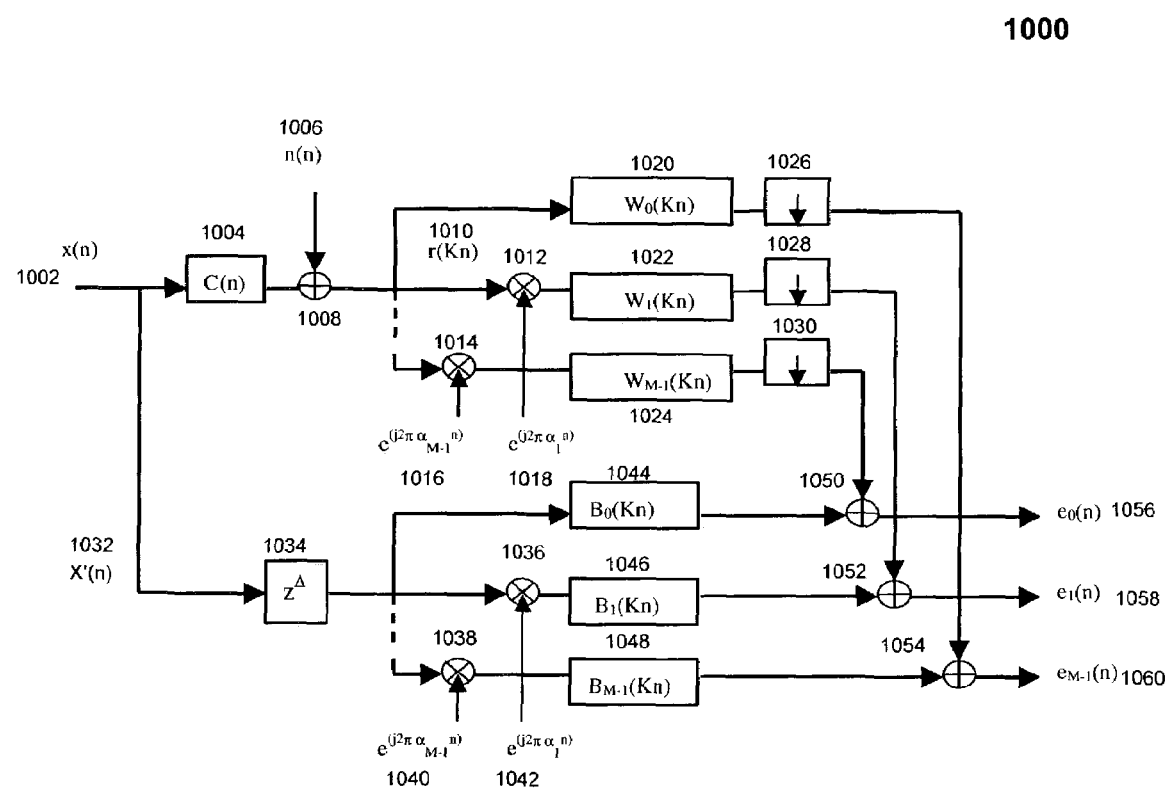
FIG. 10 is a simplified block diagram illustrating a structure of a time domain training of a cyclostationary TEQ, further illustrating a physical equalizer W and a target impulse response B.
Figure 11:
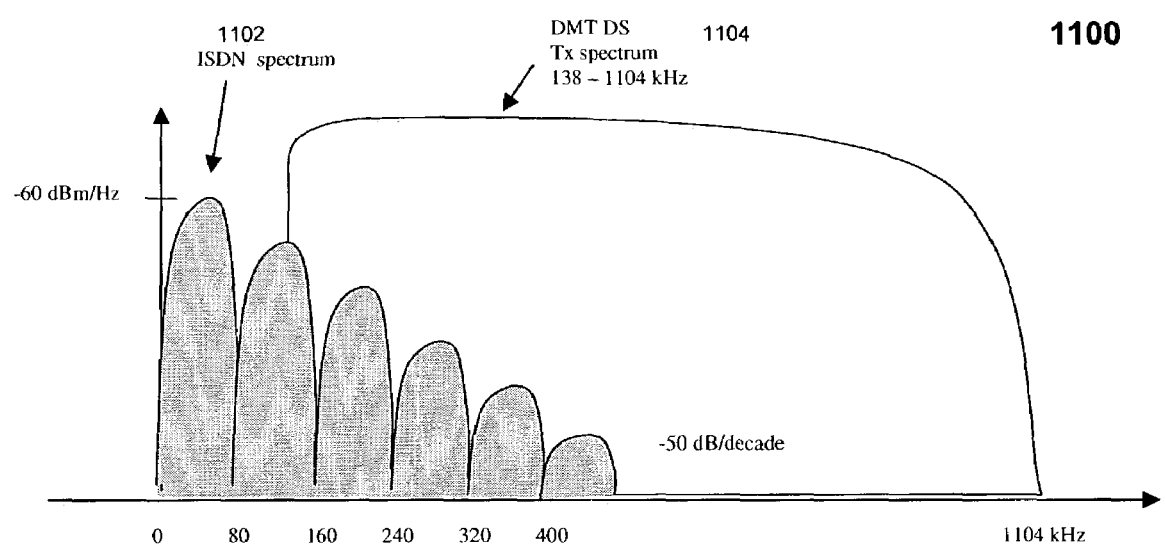
FIG. 11 is a graphical representation showing a typical bandwidth utilization of an ADSL DMT modem operating according to Annex B, without any ISDN noise canceller according to an embodiment of the present invention.
Figure 12:
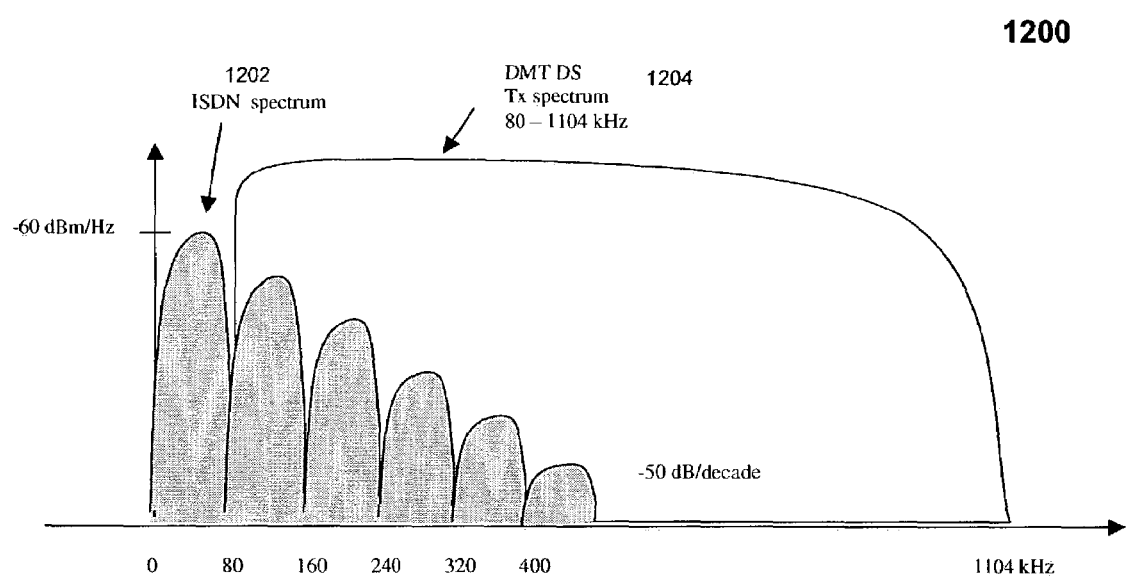
FIG. 12 is a graphical representation showing a potential bandwidth utilization of an ADSL-DMT modem operating according to Annex B, with any ISDN noise canceller.
Figure 13:
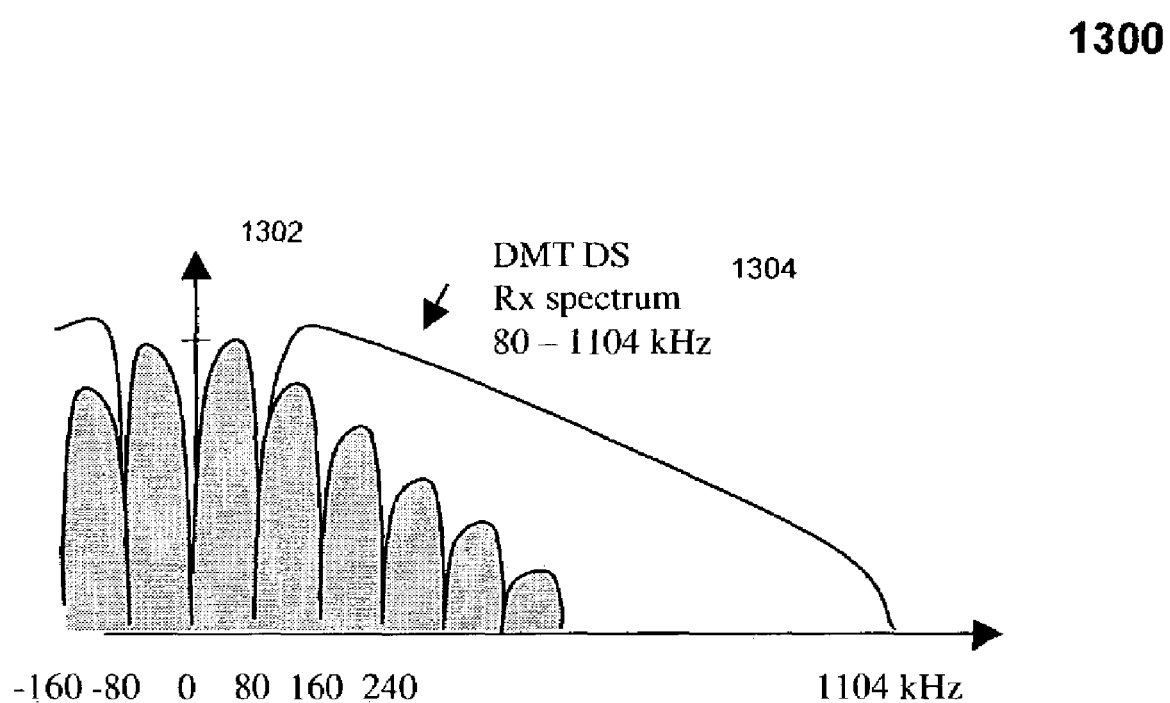
FIG. 13 is a graphical representation showing a received ADSL-DMT downstream spectrum at channel output, with ISDN noise signal.
Figure 14:
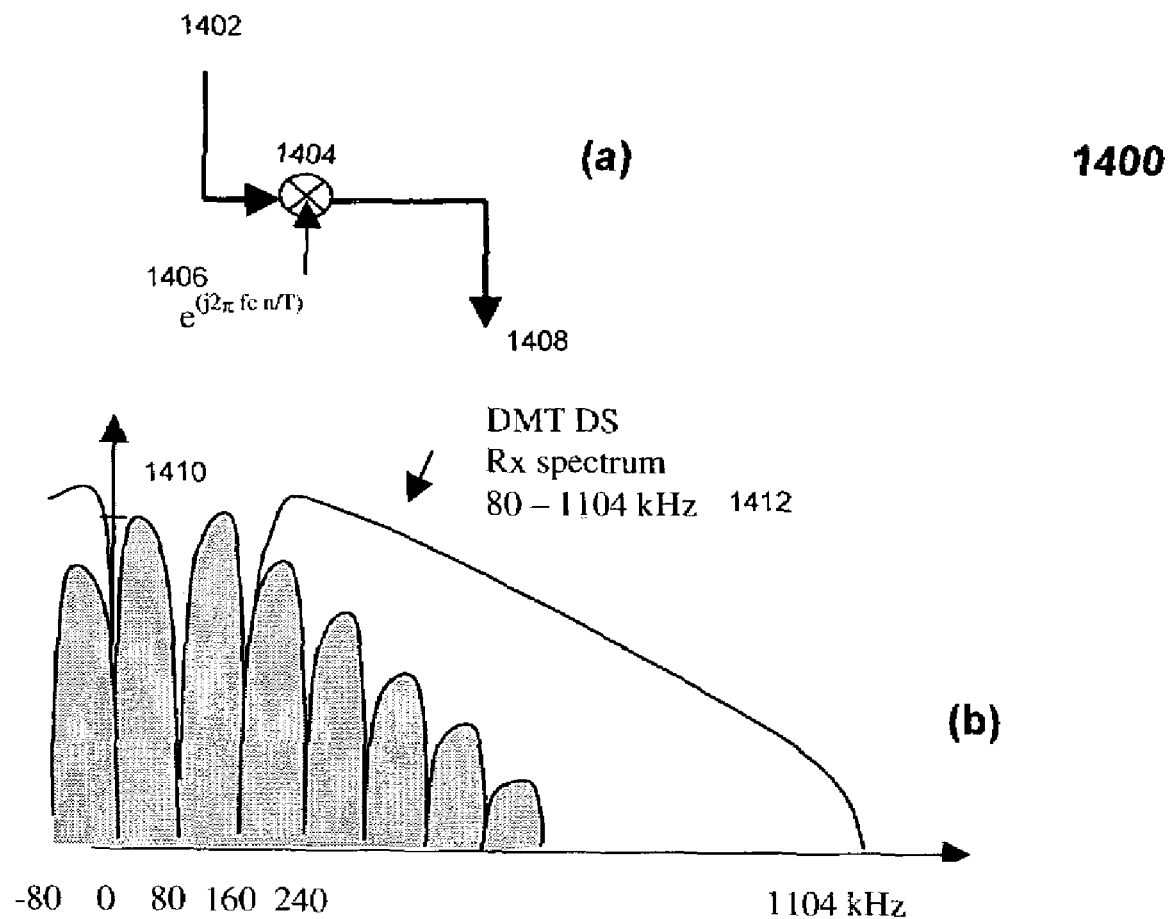
FIG. 14 is a graphical representation showing a frequency shift operation on the received DMT plus the ISDN signal.
Figure 15:
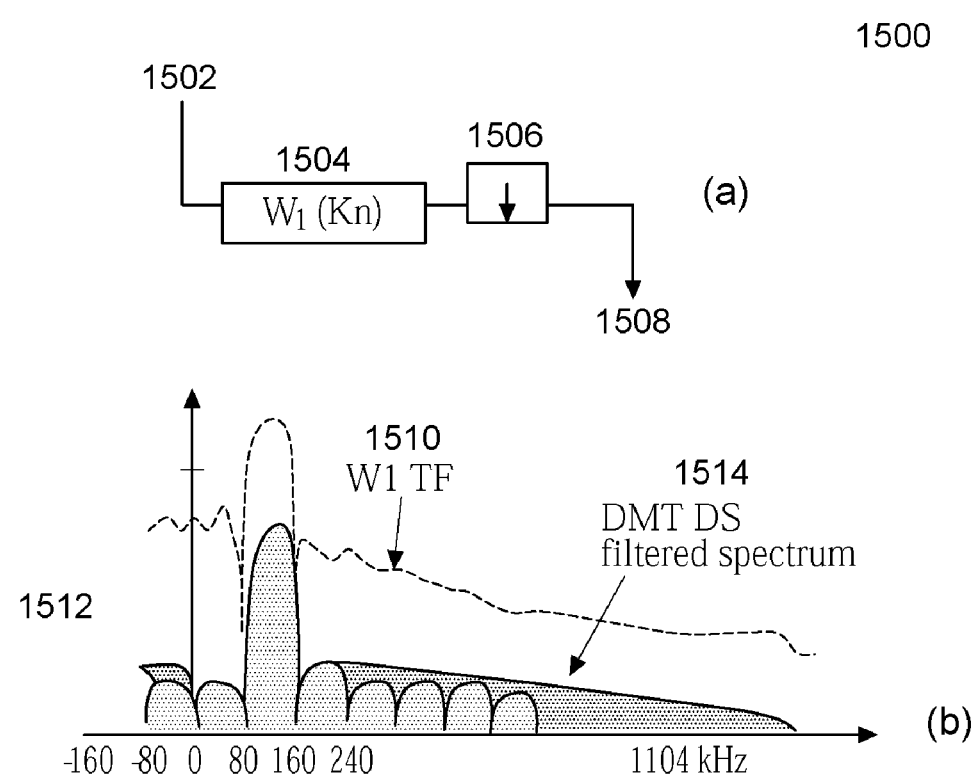
FIG. 15 is a graphical representation showing a filtering operation of one of the TEQ branches.
Figure 16:
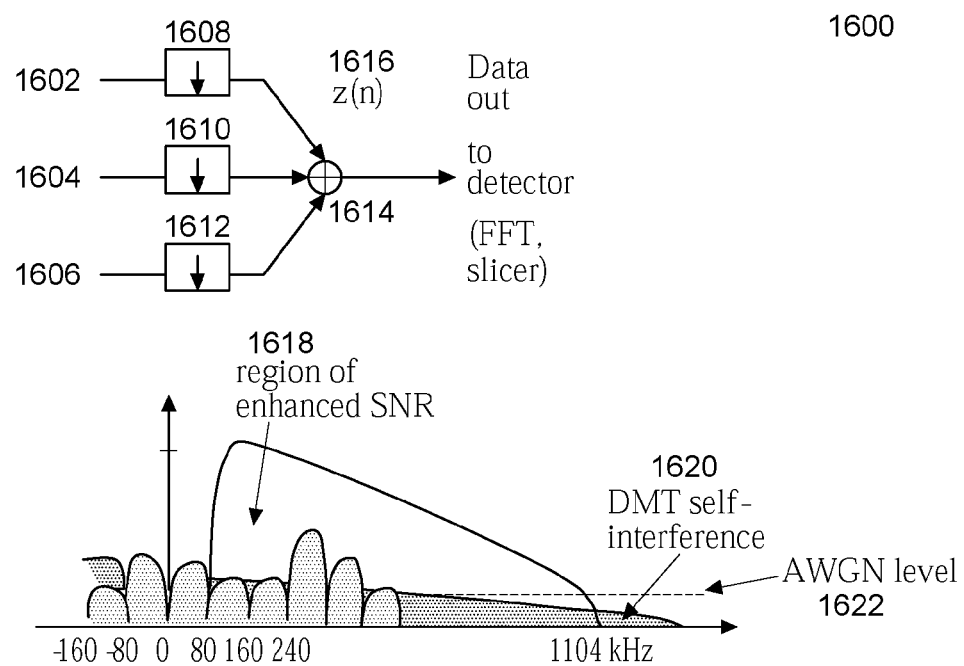
FIG. 16 is a graphical representation showing a result of combining the individual TEQ branches before presenting the output to the detector.
Figure 17:
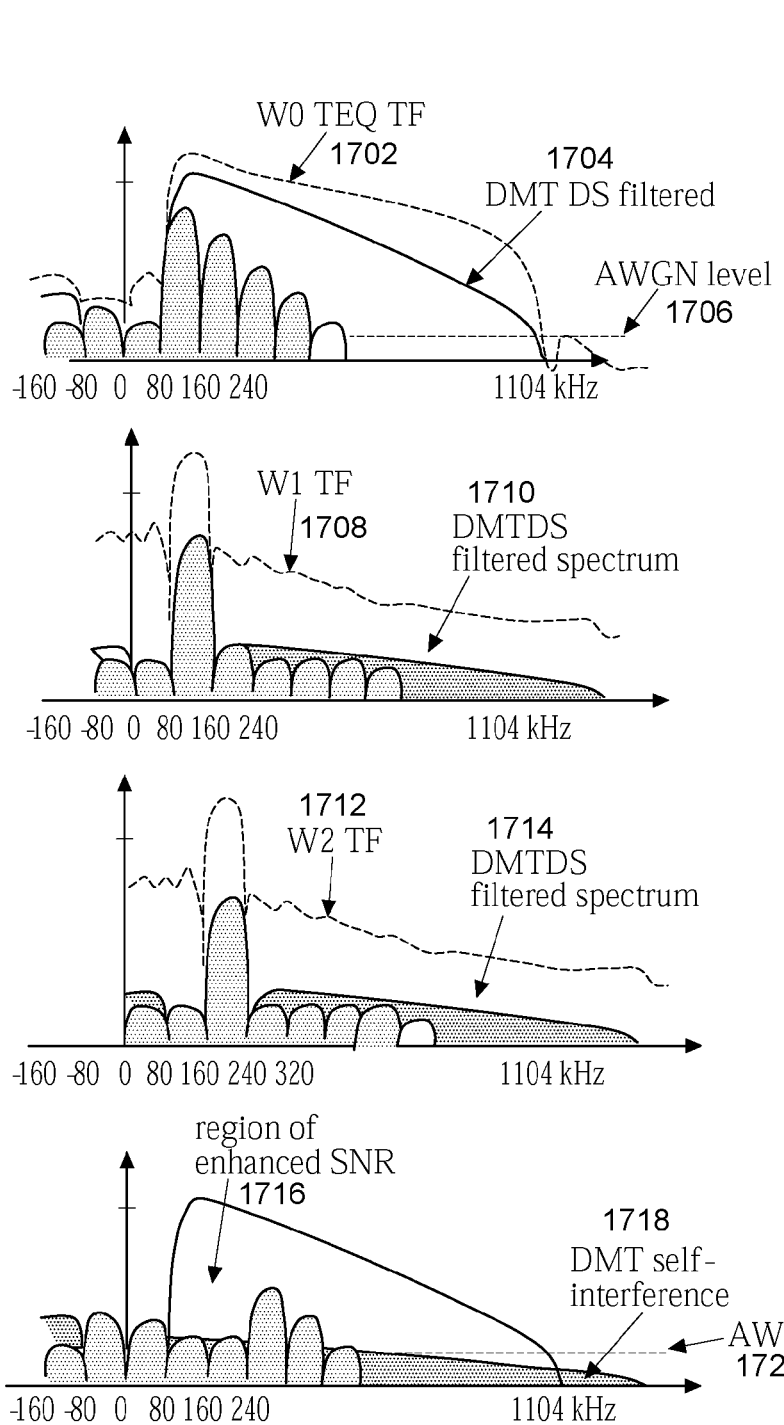
FIG. 17(a) is a graphical representation showing the $W_o$ equalizer match filtering the ADSL-DMT signal and rejecting the ISDN signal.
FIG. 17(b) is a graphical representation showing a shifted spectrum of 80 KHz of the ADSL-DMT signal and the ISDN signal filtered by the $W_1$ equalizer.
FIG. 17(c) is a graphical representation showing a shifted spectrum of 160 KHz of the ADSL-DMT signal and the ISDN signal filtered by the $W_2$ equalizer.
FIG. 17(d) is a graphical representation showing a first two ISDN in-band lobes being suppressed to a level below other noise levels.

Yet, in another embodiment of the present invention and in reference to FIG. 10, a method and apparatus of training the crosstalk canceller and equalizer of the present invention is disclosed herein. In FIG. 10, the desired signal and denoted by 1002, is transmitted through an unknown channel 1004, that distorts the desired signal, the distorted signal is combined with background noise 1006, by combiner 1008, producing a received signal 1010, and filtered by adaptive filters 1020, 1022 and 1024. Then the output of the filters is transmitted to respective downsamplers 1026, 1028 and 1030 to produce filtered outputs. In order to filter the received signal 1010, so that it resembles the desired signal 1002, an adaptive algorithm is employed. To achieve that, a replica of the desired signal 1032, is locally generated at the receiver, and transmitted to a number of target filters 1044, 1046 and 1048. Error FIGS. 1056, 1058 and 1060 are computed from the difference of the outputs of equalizers 1020, 1022, 1024 and impulse response target filters 1044, 1046 and 1048. The computed errors are then used to derive and compute both sets of equalizer coefficients ($W_0$, $W_1, \ldots W_{M-1}$) and target impulse response coefficients ($B_0$, $B_1, \ldots . B_{M-1}$); these error figures bare then used jointly or separately to derive the adaptive coefficients close to their optimum values with conventional adaptive algorithms such as LMS, RLS, or constant modulus algorithm (CMA).

Figure 18:
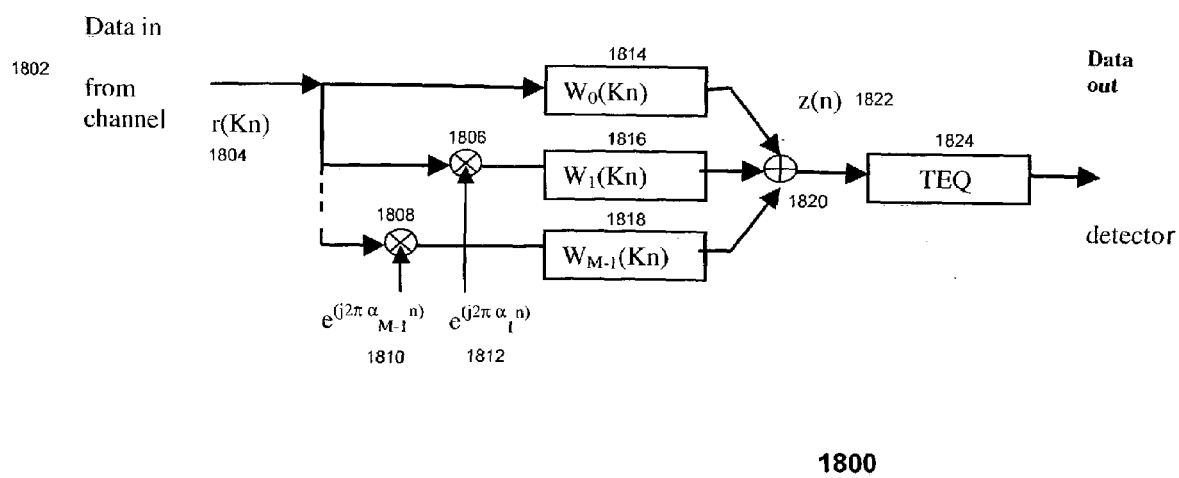
FIG. 18 is a simplified block diagram illustrating one embodiment of an equalizer structure for equalizing the channel and a separate cyclostationary noise canceller for a Multicarrier system such as DMT.

Yet, in another embodiment of the invention and in reference to FIG. 18, a method and apparatus 1800 of a crosstalk canceller is disclosed, in which an independent structure is located at the front of the receive section of a transceiver, where the equalization of the channel is not ensured by the crosstalk canceller 1814, 1816 and 1818, but rather by a subsequent Time Domain Equalizer (TEQ) structure 1824. It is a separated channel, one for equalization and another for interference rejection apparatus and method. The equalizer's operation shown FIG. 18 is independent of the crosstalk remover. The role of the crosstalk canceller is to "clean up" the useful signal from in-band crosstalk before further processing. The training and optimization of the crosstalk canceller part can be done with or without the presence of the useful signal (in this case the DMT signal).

Figure 1:
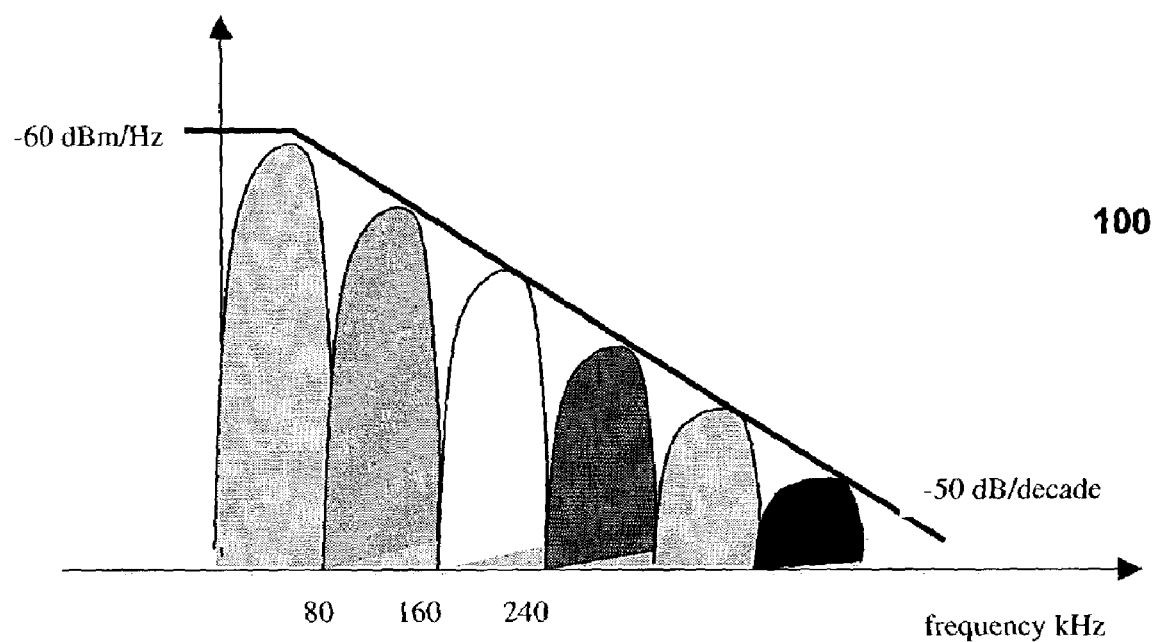
FIG. 1 is a graphical representation illustrating a conventional one-sided spectrum density of an ISDN interferer having a baud rate of 80 KHz.
Figure 2A:
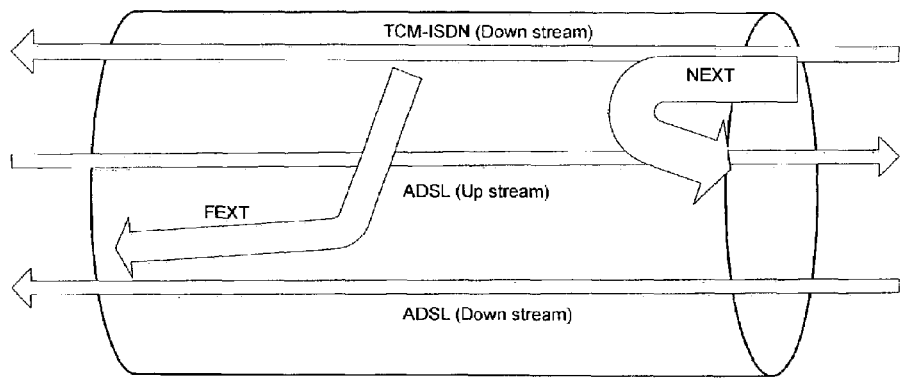
FIG. 2(a) is a graphical representation illustrating a TCM-ISDN downstream signal creating a NEXT on an upstream ADSL-DMT signal and a FEXT on a downstream ADSL-DMT signal
Figure 2B:
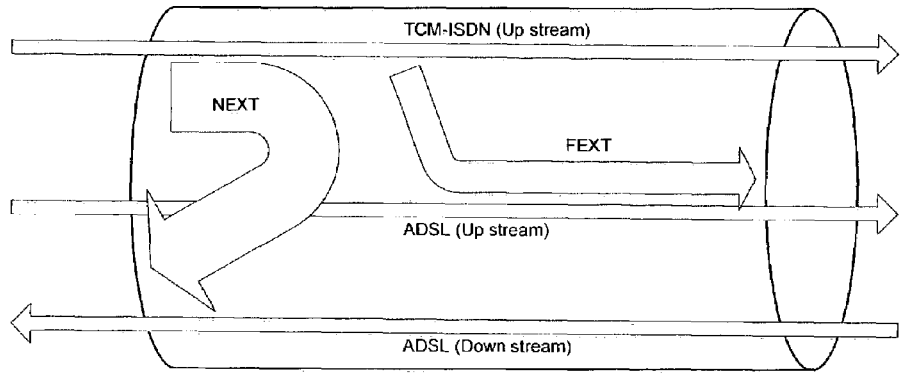
FIG. 2(b) is a graphical representation illustrating a TCM-ISDN upstream signal creating a NEXT on a downstream ADSL-DMT signal and a FEXT on an upstream ADSL-DMT signal.
Figure 19:
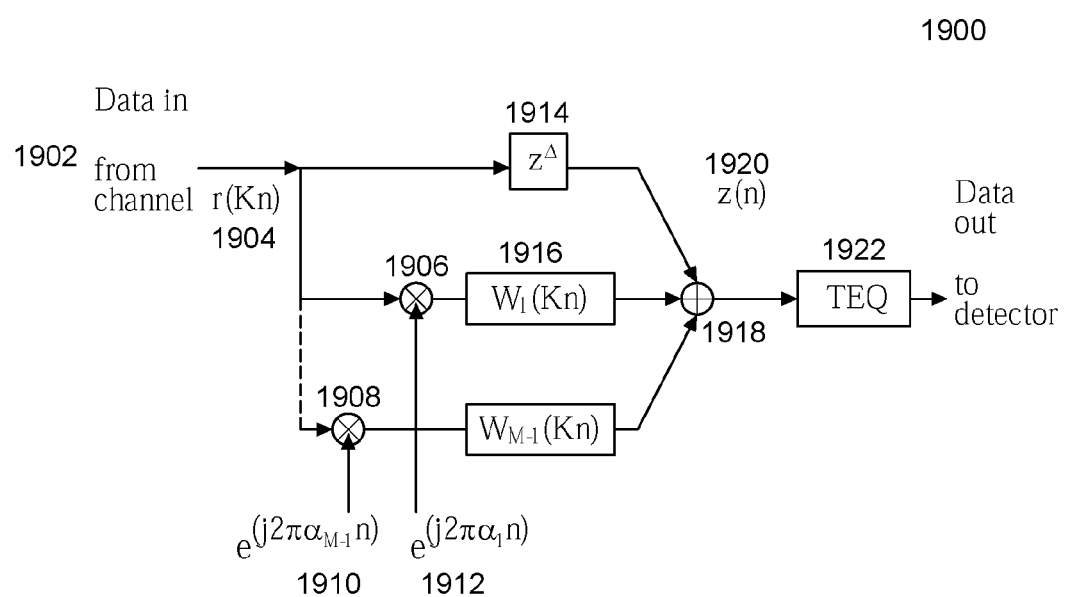
FIG. 19 is a simplified block diagram illustrating an equalizer structure and a separate cyclostationary noise canceller with a one-tap filter in the main path in accordance with an embodiment of the present invention.
Figure 20:
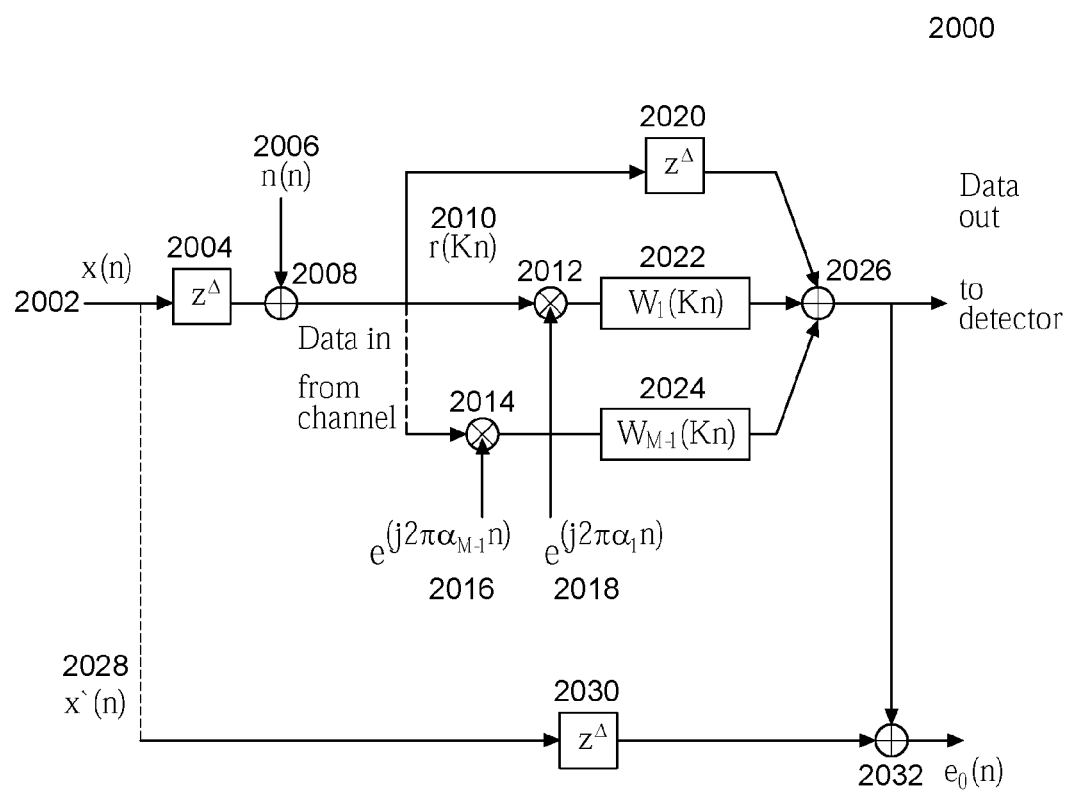
FIG. 20 is a simplified block diagram illustrating another embodiment of a cyclostationary noise canceller training structure.

By choosing the embodiment of training the crosstalk canceller in the absence of the useful signal, and only in the presence of the cyclostationary interference, the output signal 1822 in FIG. 18 is minimized, and as expected the crosstalk canceller operates in such a manner that it will cancel the interference by itself, across the whole spectrum represented in FIG. 1, as desired. The spectral components present in each of the side-lobes of the interference signal may be used to completely cancel the other spectral components of the other side-lobes of the interferer. However, since the structure is trained in the absence of the useful signal, the filters 1814, 1816 and 1818 constituting the crosstalk canceller may yield an undesirable effect on the useful signal, which will also propagate through the crosstalk canceller structure. Such undesirable effects may be (a) distortion in the direct path through filter 1814, in FIG. 18, and (b) folding the useful signal upon itself, creating a self-interference through the secondary frequency shifted paths and recombination at the canceller output. In order to overcome the problem of distortion in the direct path through filter 1814 in FIG. 18, and in accordance with one embodiment of the invention and in reference to FIG. 19, is that a simple delay 1914 is implemented in place of the filter 1814 in FIG. 18 in the direct path during training. Such an embodiment of the current invention prevents the primary path of the useful signal from being distorted. It can easily be obtained by constraining the filter 1814 in FIG. 18 to a single tap filter during training and steady-state operation. And in order to avoid folding of the useful signal upon itself which creates self-interference through the secondary frequency shifted paths one exemplary embodiment of the present invention is to incorporate a training sequence that operates in the presence of both the useful signal and the interferer, such a method is illustrated in FIG. 20, where the useful signal 2002 is transmitted through the channel, the channel represented by a simple delay 2004 for ease of understanding, at the same time, a replica of the useful signal 2002, represented by 2028 in FIG. 20 which is noiseless is applied with a delay 2030. At the output of the channel, a cyclostationary interference is added. During training the replica of the known training sequence 2028 is locally generated at the receiver (knowing the same sequence 2002 is being transmitted during a given moment of the start-up sequence), and then is used to perform the training of the crosstalk canceller. The optimization may not take place by minimizing the output of the crosstalk canceller itself, rather the optimization is achieved by minimizing the difference between the output of the canceller 2026 and a replica of the input noiseless sequence 2028 applied with a delay 2030. The object of the embodiment is to have at the output of the crosstalk canceller a signal, which is close to or identical to the noiseless form 2002. Thus, the crosstalk canceller removes the cyclostationary interference without affecting the useful signal. The error denoted by $e_0$ may be used to adapt the crosstalk canceller during the training sequence.

Figure 21:
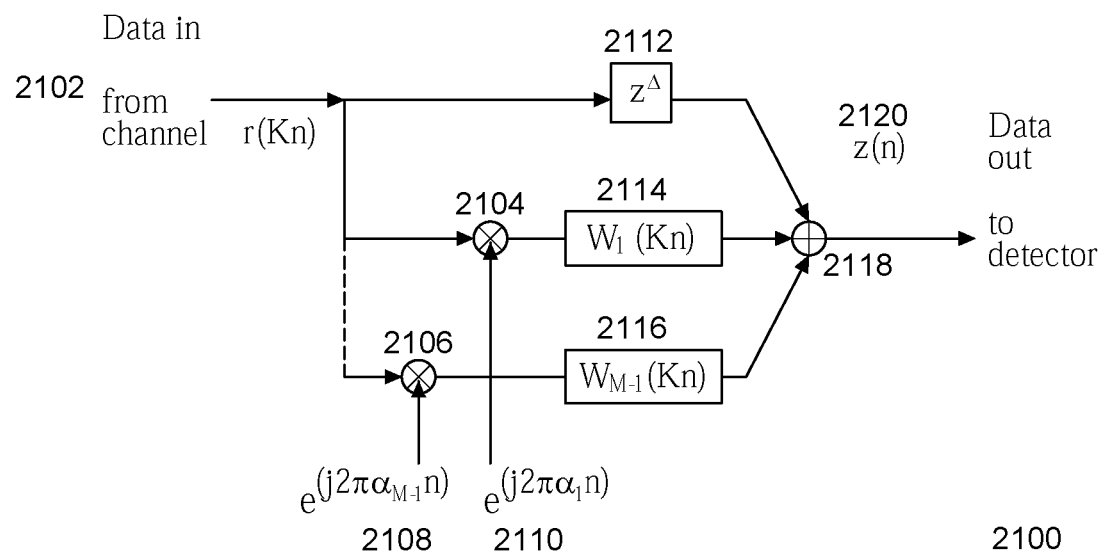
FIG. 21 is a simplified block diagram illustrating a cyclostationary stand-alone noise canceller structure for a Multicarrier system such as DMT in accordance with one embodiment of the present invention.

It should be noted that in FIG. 21, the presence of the TEQ is not necessary, the channel being a pure delay does not introduce distortion to the useful signal. Hence, the TEQ need not undo any distortion.

In the more realistic case where a real channel 2204 creates attenuation and distortion to the useful signal, a TEQ 2230 will be necessary, and can possibly be placed downstream from the crosstalk cancellers 2220, 2222, and 2224. In reference to FIG. 22, an embodiment of the current invention is to place an additional filter 2236 for the training phase. Its presence is necessary since the useful signal 2202 to which it is desired to have the crosstalk's output resemble as closely as possible, suffers attenuation and distortion through the unknown channel 2204. After proper convergence, it is expected that the filter 2236 would become a replica of the unknown channel 2204. Alternatively, the filter 2236 could also be devised independently through proper channel estimation, before the training of the crosstalk cancellers 2220, 2222, and 2224. However, it is suggested in the embodiment that both convergence of the filter 2236 and the crosstalk cancellers 2220, 2222, and 2224 can be achieved jointly in an adaptive manner. The objective of the training of the crosstalk cancellers 2220, 2222, and 2224 remains identical as in the manner outlined earlier, to ensure that its output resembles as closely as possible the known noiseless sequence 2232 applied to filter 2236, which is expected to approach a replica of 2204. In order for the crosstalk canceller's 2220, 2222, and 2224 output to be similar to a noiseless output of the channel 2204, the cancellers 2220, 2222, and 2224 has to remove most of the interferer disturbance. Once that is achieved, the output of the crosstalk canceller 2228 can then be fed to the TEQ 2230 for channel equalization.

Figure 22:
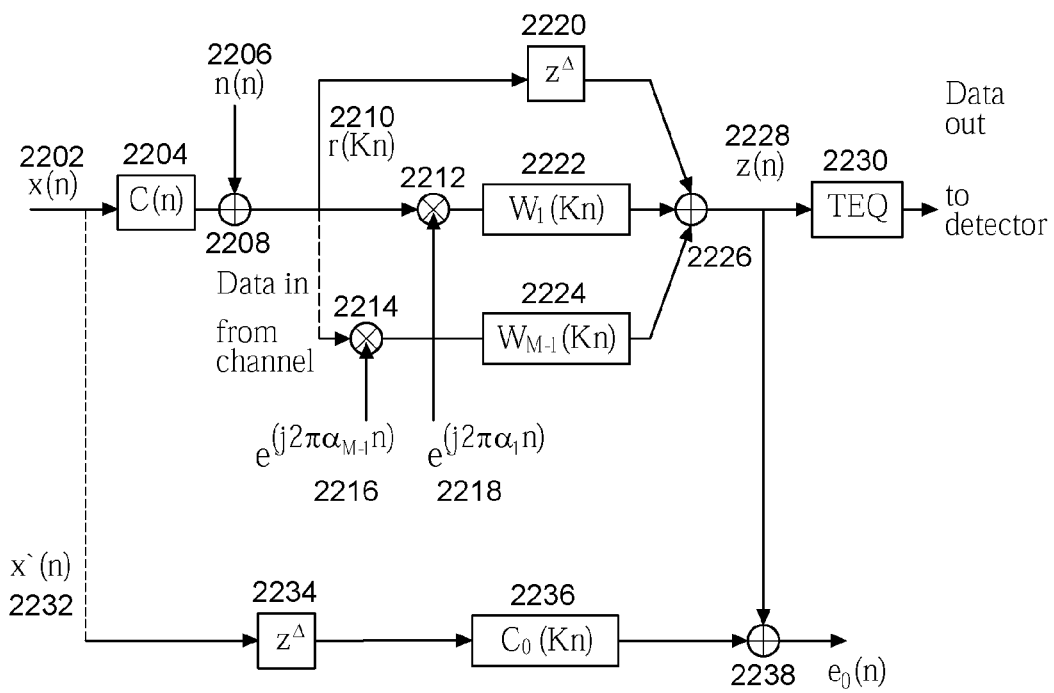
FIG. 22 is a simplified block diagram illustrating another embodiment of a cyclostationary canceller and equalizer training structure of the present invention.
Figure 23:
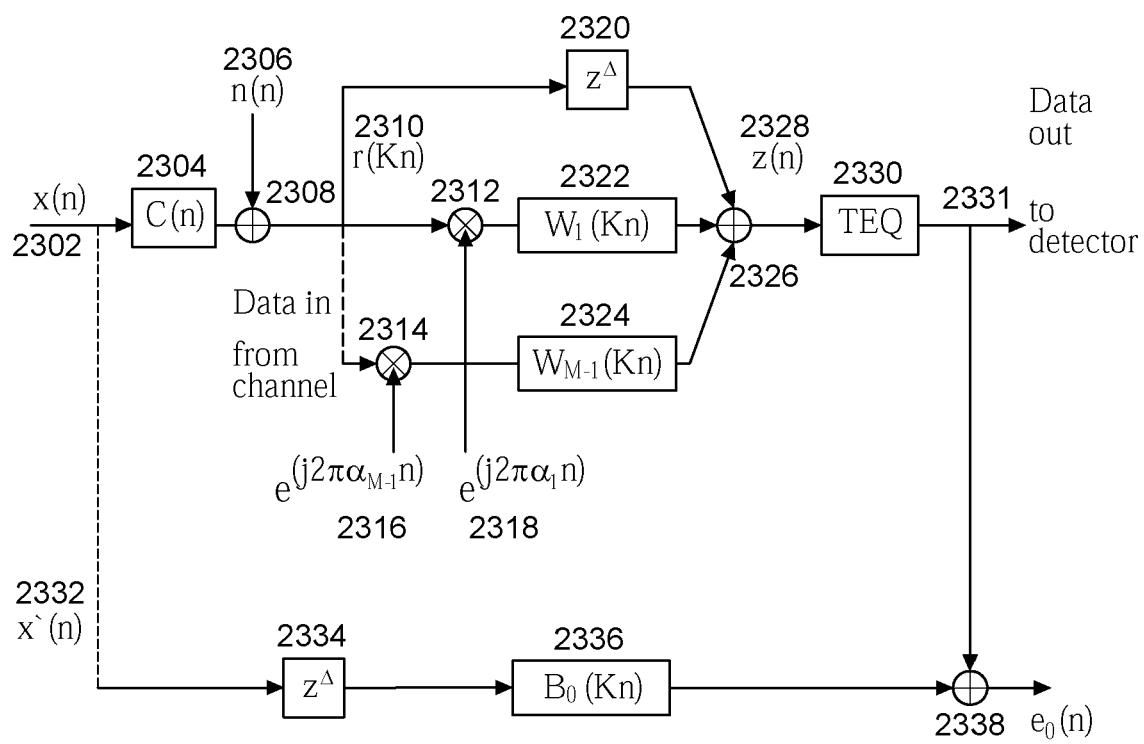
FIG. 23 is a simplified block diagram illustrating another embodiment of a cyclostationary canceller and equalizer training structure of the present invention.

In another embodiment, and in reference to FIG. 23, the time domain equalizer, TEQ 2330 is trained after a successful training of the crosstalk cancellers 2320, 2322, and 2324 in the same manner depicted in FIG. 22 with which a classical TEQ would be trained in DMT. The TEQ is trained, such that its output matches as closely as possible the output of a so-called target filter 2336 of a specified length (Cyclic prefix length) fed with a replica of the noiseless known training sequence 2332. The crosstalk cancellers 2320, 2322, and 2324 frozen with their optimum coefficients during the TEQ training, removing all cyclostationary disturber, without affecting the useful signal. The TEQ training therefore takes place as if there were no disturber. As in the absence of an interferer, the optimization of the TEQ is done such that the combined channel C(n)/TEQ impulse response does not exceed the target impulse response of target filter 2336, corresponding to the cyclic prefix length of a DMT system. By implementing this embodiment, it is ensured that no inter-symbol interference (ISI) between consecutive DMT symbols takes place, and that the orthogonality between carriers is maintained within a same DMT symbol, avoiding Inter-Channel Interference (ICI). In FIG. 23, the crosstalk canceller propagates the receive signal (useful and interference) in it's direct path. Also it's secondary paths perform a frequency-shift of the interferer and subtract it from the main path output, while minimizing the amount of self-interference to the useful signal, hence, at its output, the signal 2328 is free of interference. The TEQ 2330 then equalizes the noiseless, useful signal to the cyclic prefix length. It is an independent equalizer and crosstalk canceller structure. However, the crosstalk canceller has been trained in the presence of the useful signal, in order not to degrade it.

Figure 24:
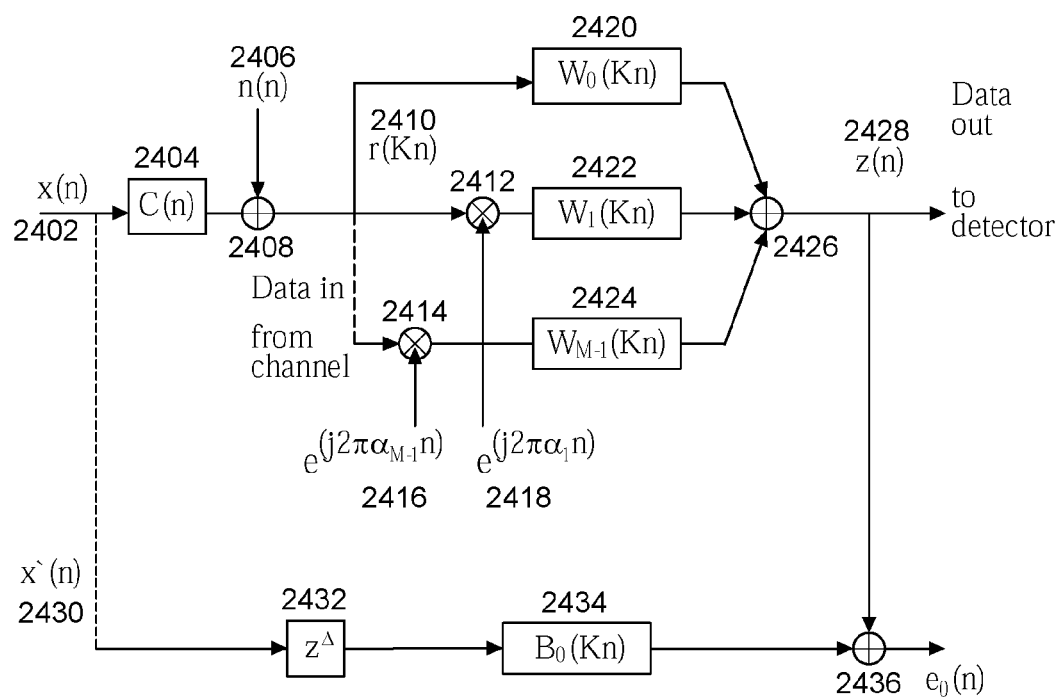
FIG. 24 is a simplified block diagram illustrating a combined cyclostationary canceller and equalizer training structure adapted for the training of the whole structure in accordance with one embodiment of the present invention.

In another embodiment of the current invention and in reference to FIG. 24, a target filter 2434 is introduced into the structure and the TEQ filter is incorporated in the direct path of the crosstalk canceller as filter 2420, so that the training of the crosstalk canceller is done jointly with the one of the TEQ. The filter coefficients are derived such that the combination of the output of the TEQ filter with the output of the crosstalk canceller matches as close as possible in a minimum mean square error sense, the output of the target filter 2434 of a cyclic prefix length fed by a replica of the noiseless transmitted sequence 2430. When convergence is achieved, two objectives of the filter structure maybe achieved, equalizing the useful signal to the cyclic prefix length and rejecting the cyclostationary interference. In this structure, however, the respective roles of the crosstalk canceller and the TEQ will be less clearly identifiable. Equalizing the useful signal will primarily be performed by the 2420, but since the filter 2420 will affect the interference signal as well through this process, it is expected that the filters 2422, and 2424 of the other branches will have to compensate for this effect in order to properly cancel the interferer itself. Therefore, the filters 2420, 2422, and 2426 of the structure have been given a same labeling $W_0$, $W_1$ . . . $W_{M-1}$, since their optimum setting is a joint optimization process.

Figure 25:
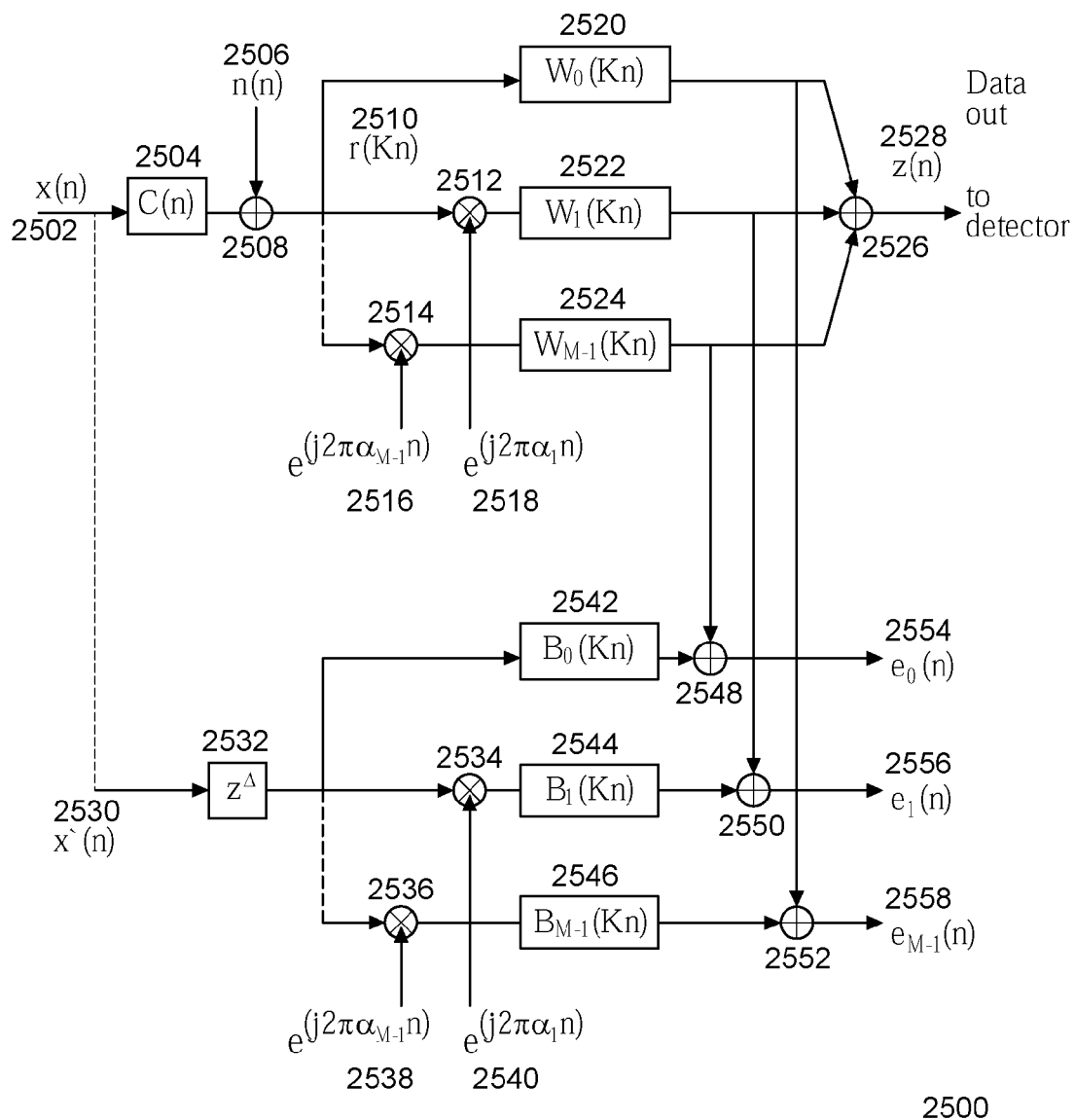
FIG. 25 is a simplified block diagram illustrating another embodiment of a combined cyclostationary canceller and equalizer training structure optimized for the training of the whole structure.
Figure 26:
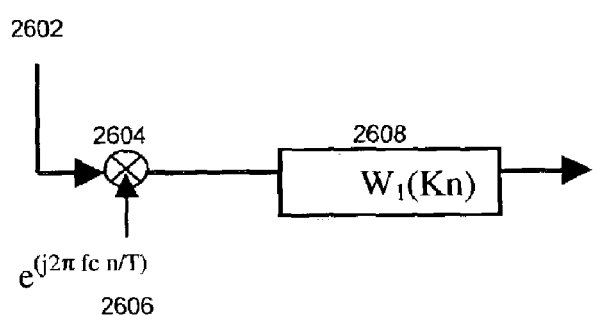
FIG. 26 is a simplified block diagram illustrating a mathematical representation of a frequency shifter structure showing a complex operation.
Figure 27:
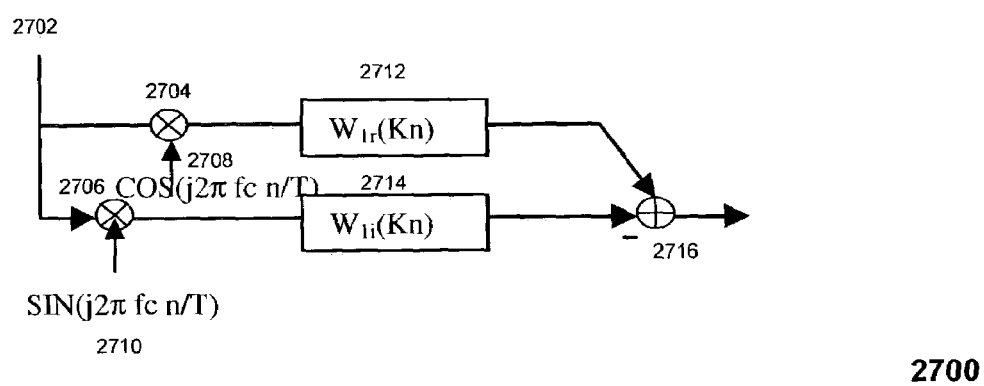
FIG. 27 is a simplified block diagram illustrating a mathematical representation of a frequency shifter structure showing a complex operation where only the real part is utilized.
Figure 28:
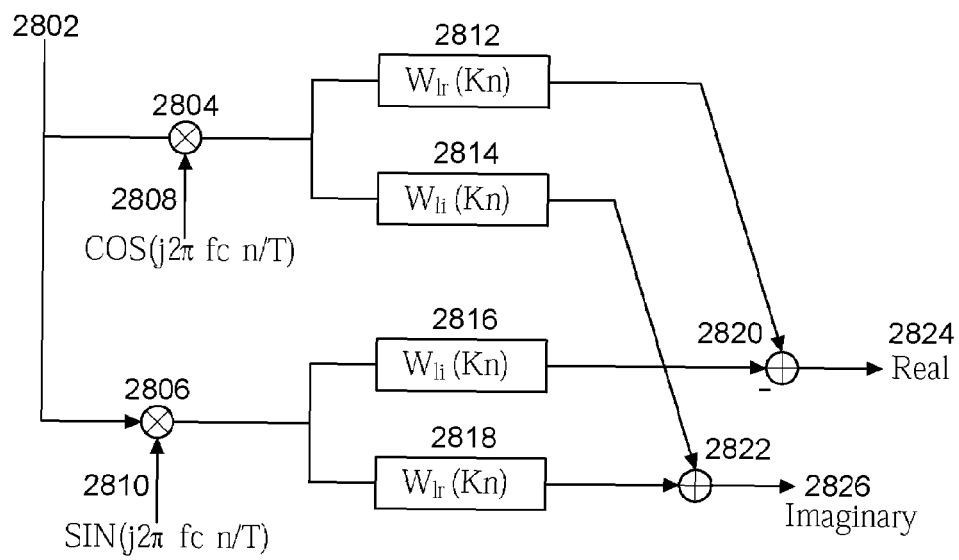
FIG. 28 is a simplified block diagram illustrating a mathematical representation of a frequency shifter structure showing a complex operation where both the real and imaginary parts are utilized.
Figure 29:
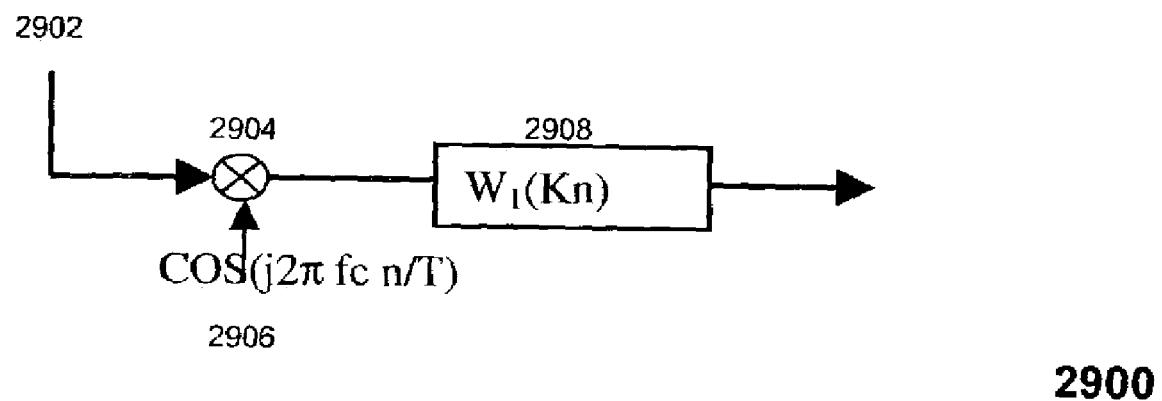
FIG. 29 is a simplified block diagram illustrating a reduced mathematical representation of a frequency shifter structure operation where only a single multiplication with a sine wave is performed.
Figure 30:
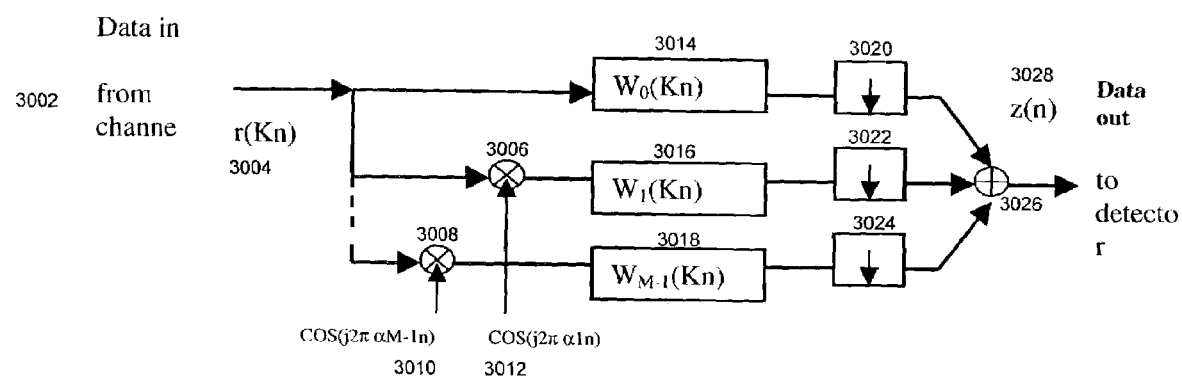
FIG. 30 is a simplified block diagram illustrating a cyclostationary equalizer structure and noise canceller having simple demodulation using a cosine or a sine in accordance with one embodiment of the present invention.

When the series of corresponding target filters 2422, and 2426 with frequency shifts are implemented for proper optimization, the filters tend to filter not only the side-lobes of the interference signal in order to cancel it in the main branch, as they would have in a separate crosstalk TEQ structure, but to some extent, some energy of the useful signal is let through in the same manner. However, when some energy of the useful signal is let through the secondary paths, it is needed to ensure that the corresponding target impulse response of the combined channel and secondary paths be shorter than the cyclic prefix length, otherwise, the undesirable effect will be to create ISI and ICI through the secondary frequency shifted branches, similar to the one that would be created if the $B_0$ target impulse response length were exceeded in the main path. In another implementation of the embodiment of FIG. 24, and in reference to FIG. 25, a series of target impulse responses filters 2542, 2544, and 2546 with frequency shifts, which will be used to constrain the respective combined channel 2504 and the filters 2520, 2522 and 2524 below the cyclic prefix length is included in the structure. By implementing such filters, undesirable ISI and ICI effects are limited, when the useful signal energy propagates through the secondary paths. The error signals $e_0, e_1, \ldots e_{M-1}$ can be used individually or in any combination to adapt the various filters 2520, 2522 and 2524 and target filters 2542, 2544, and 2546.

While the invention has been described in conjunction with the preferred embodiments, it should be understood that modifications will become apparent to those of ordinary skill in the art and that such modifications are intended to be included within the scope of the invention and the following claims.

I claim:

1. A method for reducing crosstalk in Digital Subscriber Line (DSL) Discrete Multi-tone (DMT) modems with the presence of other modulated signals, comprising:

receiving a signal that comprise a desired DMT signal plus an interferer from a channel;

frequency shifting the received signal to produce multiple versions of the received signal;

providing a combined crosstalk equalizer and frequency-shifted adaptive filters to reconstruct the DMT signal and reduce crosstalk noise;

downsampling the signal outputs of both the combined crosstalk equalizer and the frequency-shifted adaptive filters to reduce sampling rate; and summing the outputs of the combined crosstalk equalizer and the frequency-shifted adaptive filters.

2. The method of claim 1, wherein the combined crosstalk equalizer equalizes the channel and removes crosstalk.

3. The method of claim 1, wherein during training, the output of the combined crosstalk equalizer matches the output of a target filter that receives a noiseless training sequence.

4. The method of claim 3, wherein the combined crosstalk equalizer is trained in the absence of the desired signal.

5. The method of claim 3, wherein during training, the combined crosstalk equalizer is constructed with one tap to avoid distortion of the desired DMT signal.

6. The method of claim 3, wherein the combined crosstalk equalizer and the frequency-shifted adaptive filters are trained in the presence of the desired DMT signal to avoid self-interference of the desired upon itself.

7. The method of claim 1, wherein a replica of the desired DMT signal is generated locally at the receiver.

8. The method of claim 1, wherein the interferer is a cyclostationary signal.

9. The method of claim 8, wherein the cyclostationary signal is an Integrated Service Digital Network (ISDN) signal.

10. The method of claim 9, wherein the ISDN signal is a Time Compression Multiplexed-Integrated Services Digital Network (TCM-ISDN) signal.

11. The method of claim 8, wherein spectral components of the interferer signal side lobes cancel each other.

12. The method of claim 1, wherein the frequency-shifting of the received signal corresponds to multiples of the ISDN baud rate.

13. The method of claim 1, wherein the sampling rate is conserved at a high rate to avoid aliasing.

14. The method of claim 1, wherein one of a group of fixed, low-pass, high-pass, or band-pass filters are implemented in order to isolate the desired signal components from the interferer signal.

15. An apparatus for reducing crosstalk in Digital Subscriber Line (DSL) Discrete Multi-tone (DMT) modems with the presence of other modulated signals, comprising:

a receiver for receiving a signal that comprises a desired DMT signal plus an interferer from a channel;

a frequency-shifter that produces multiple versions of the received signal;

a combined crosstalk equalizer and frequency-shifted adaptive filters to reconstruct the DMT signal and reduce crosstalk noise;

downsamplers to downsample the signal outputs of both the combined crosstalk equalizer and the frequency-shifted adaptive filters to reduce sampling rate; and a combiner that sums the outputs of the combined crosstalk equalizer and the frequency-shifted adaptive filters.

16. The apparatus of claim 15, wherein the combined crosstalk equalizer equalizes the channel and removes crosstalk.

17. The apparatus of claim 15, wherein during training, the output of the combined crosstalk equalizer matches the output of a target filter that receives a noiseless training sequence.

18. The apparatus of claim 17, wherein the combined crosstalk equalizer is trained in the absence of the desired signal.

19. The apparatus of claim 17, wherein during training, the combined crosstalk equalizer is constructed with one tap to avoid distortion of the desired DMT signal.

20. The apparatus of claim 17, wherein the combined crosstalk equalizer and the frequency-shifted adaptive filters are trained in the presence of the desired DMT signal to avoid self-interference of the desired upon itself.

21. The apparatus of claim 15, wherein a replica of the desired DMT signal is generated locally at the receiver.

22. The apparatus of claim 15, wherein the interferer is a cyclostationary signal.

23. The apparatus of claim 22, wherein the cyclostationary signal is an Integrated Services Digital Network (ISDN) signal.

24. The apparatus of claim 23, wherein the ISDN signal is a Time Compression Multiplexed-Integrated Services Digital Network (TCM-ISDN) signal.

25. The apparatus of claim 22, wherein spectral components of the interferer signal side lobes cancel each other.

26. The apparatus of claim 15, wherein the frequency-shifting of the received signal corresponds to multiples of the ISDN baud rate.

27. The apparatus of claim 15, wherein the sampling rate is conserved at a high rate to avoid aliasing.

28. The apparatus of claim 15, wherein one of a group of fixed, low-pass, high-pass, or band-pass filters are implemented in order to isolate the desired signal components from the interferer signal.

* * * * *